(12) United States Patent
Wakai

(10) Patent No.: US 6,196,506 B1
(45) Date of Patent: Mar. 6, 2001

(54) PLATE-SHAPED FASTENER

(75) Inventor: Takao Wakai, Osaka (JP)

(73) Assignee: Wakai & Co., Ltd., Osaka (JP)

( * ) Notice: Subject to any disclaimer, the term of this patent is extended or adjusted under 35 U.S.C. 154(b) by 0 days.

(21) Appl. No.: 09/368,080

(22) Filed: Aug. 3, 1999

(51) Int. Cl.[7] .................................................. A47B 96/06
(52) U.S. Cl. ........................................ 248/216.1; 248/300
(58) Field of Search ............................. 248/216.1, 216.4, 248/217.2, 217.3, 300

(56) References Cited

U.S. PATENT DOCUMENTS

| | | | | |
|---|---|---|---|---|
| 3,547,389 | * | 12/1970 | Mitchell | 248/220.5 |
| 3,791,614 | * | 2/1974 | Scheer | 248/216.1 |
| 5,267,718 | * | 12/1993 | Sheehan | 248/475.1 |
| 6,036,149 | * | 3/2000 | Del Pino et al. | 248/216.1 X |

FOREIGN PATENT DOCUMENTS 10-267023 * 6/1998 (JP).

* cited by examiner

Primary Examiner—Ramon O. Ramirez
(74) Attorney, Agent, or Firm—Wenderoth, Lind & Ponack, L.L.P.

(57) ABSTRACT

A plate-shaped fastener is used to secure a member or an instrument to a wall of plasterboard so constructed as to be not accessible to its back. A driving portion with a pointed tip and an extension are integrally formed from a single bendable thin metal plate. A cut is formed in the thin metal plate to form the driving portion and the extension. The driving portion is driven into the wall and pulled back against one side of the wall and the extension is bent and pressed against the other side of the wall to sandwich the wall between the driving portion and the extension. A screw is then driven through the member, extension, wall and the driving portion to secure the member to the wall.

9 Claims, 8 Drawing Sheets

PLATE-SHAPED FASTENER

BACKGROUND OF THE INVENTION

This invention relates to a plate-shaped fastener for mounting a member or an instrument to e.g. a wall made of plasterboard by means of screws.

A conventional method for mounting members or instruments to a wall so constructed as to be not accessible to its back comprises drilling a hole in the wall, inserting a plug into the hole, expanding the plug therein to form an engaging portion, and threading a screw into the plug to secure a member or an instrument to the wall.

Quality-wise, a plasterboard is brittle, so that the above conventional method, in which the plug is expanded in the hole of the wall to form an anchor, cannot provide strong resistance to pulling force and is low in tightening force. Thus, if the screw is tightened hard, the plug might turn together with the screw and come out.

An object of this invention is to provide a plate-shaped fastener which is high in resistance to pulling force, provides a firm tightening feeling, prevents idling, and which can firmly fix a member or an instrument to such a wall.

SUMMARY OF THE INVENTION

According to the invention, there is provided a plate-shaped fastener comprising a driving portion with a pointed tip, and an extension extending at an angle with respect to the driving portion with the rear end of the driving portion serving as a driving end, wherein the driving portion and the extension are integrally formed from a single bendable thin metal plate, the driving portion being formed with an engagement hole for a screw and the extension being formed with an insertion hole for the screw.

Other features and objects of the present invention will become apparent from the following description made with reference to the accompanying drawings, in which:

DETAILED DESCRIPTION OF THE PREFERRED EMBODIMENT

Figure 1A:
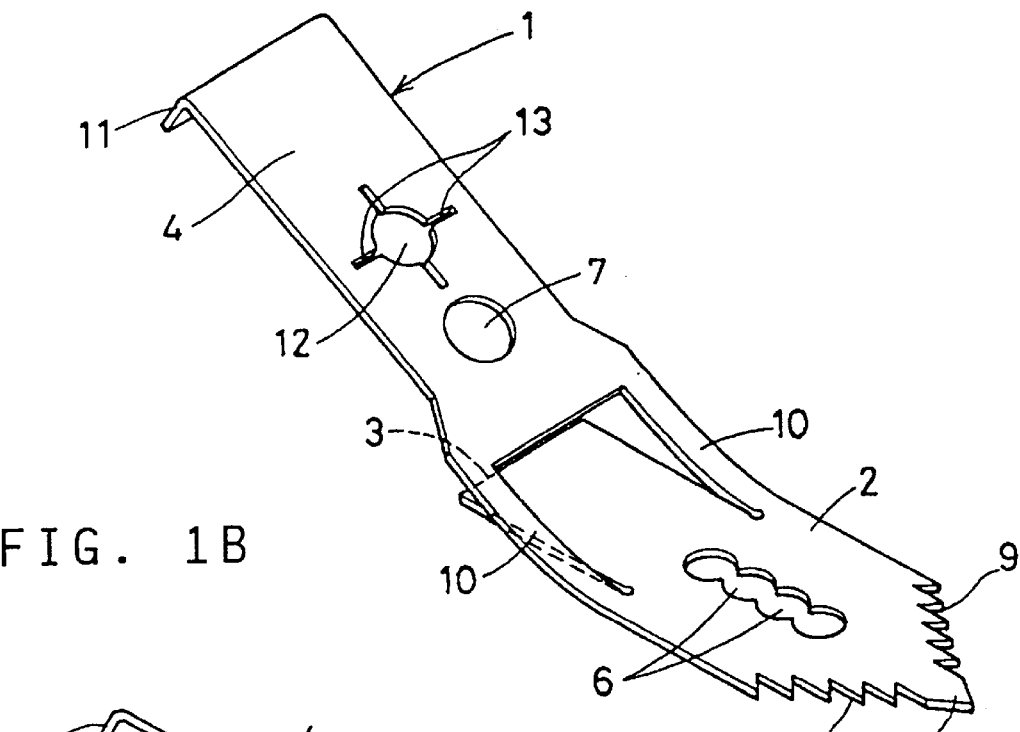
FIG. 1A is a perspective view of a first embodiment of a plate-shaped fastener.

Several embodiments of this invention are described with reference to the drawings.

First Embodiment

In the first embodiment shown in FIGS. 1–4, the plate-shaped fastener 1 is formed from a single thin bendable metal sheet and comprises a driving portion 2 with a pointed tip 8, and an extension 4 integrally protruding to one side at a predetermined angle from the driving portion 2 with a cut end 3 left at the rear end of the driving portion 2. At the widthwise central position of the driving portion 2, an engagement hole 6 for a screw 5 is formed. At the widthwise central position of the extension 4, an insertion hole 7 for the screw 5 is formed.

The driving portion 2 serves as a washer for threadedly holding the screw 5. Both sides of the pointed tip 8 are inclined rearwardly, and a plurality of sharp blades 9 are arranged along the inclined edges. The engagement hole 6 for the screw 5 is formed such that a plurality of protrusions are arranged on the inner periphery of an elongate hole by arranging a plurality of holes having a diameter substantially equal to the root diameter of the threads formed on the screw 5 so as to lap one after another.

The extension 4 is formed as a strip integrally connecting with the driving portion 2 through bridge portions 10 at both sides. By arcuately bending the bridge portions 10, the extension 4 integrally connects with the driving portion 2 at a suitable angle.

The screw insertion hole 7 formed in the extension 4 has such a diameter that the threads of the screw 5 can pass. At the rear end of the extension 4, a bent portion 11 bent at a right angle toward the underside may be provided for the convenience of driving. In order that the rear portion of the extension 4 can be bent and removed, a through hole 12 and slits 13 are formed near the rear end of the extension 4.

In order to form the driving portion 2 and the extension 4 from a single thin metal sheet, a thin sheet having such a size and shape that it will integrally have the driving portion 2 and the extension 4 is prepared, and a cut 14 having a U-shape is formed at the center of this thin sheet, both sides of the cut 14 forming bridge portions 10. With respect to the driving portion 2, the extension 4 is bent at the bridge portions 10 so as to have an angle.

Figure 1B:
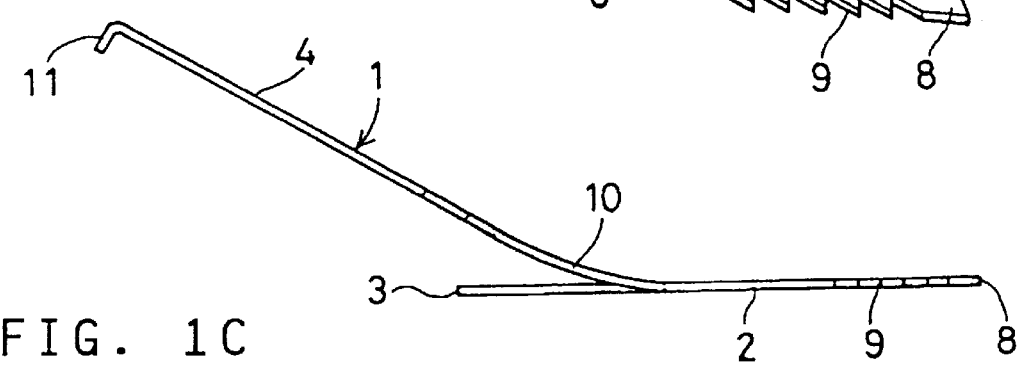
FIG. 1B is its side view.
Figure 1C:
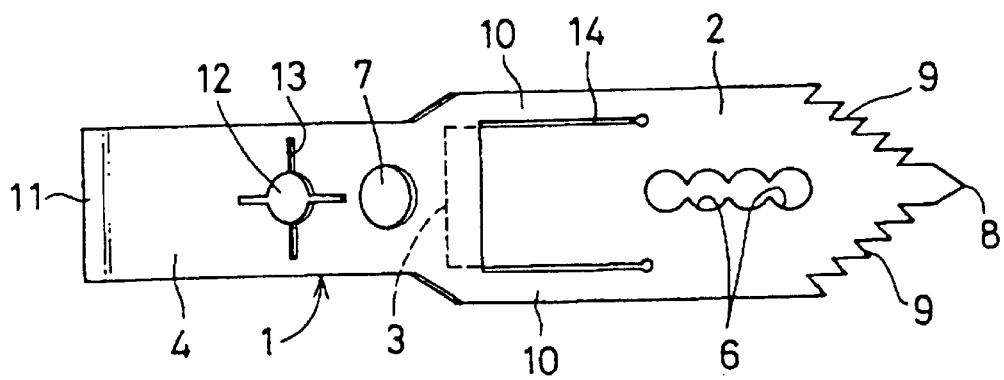
FIG. 1C is a plan view of the same.

The portion of the driving portion 2 surrounded by the cut 14 remains flat and extends rearwardly as shown in FIG. 1B. Its rear end is the driving end 3.

The plate-shaped fastener of the first embodiment has a structure as described above. Using FIGS. 2 and 3, we shall describe how to use it.

Figure 2A:
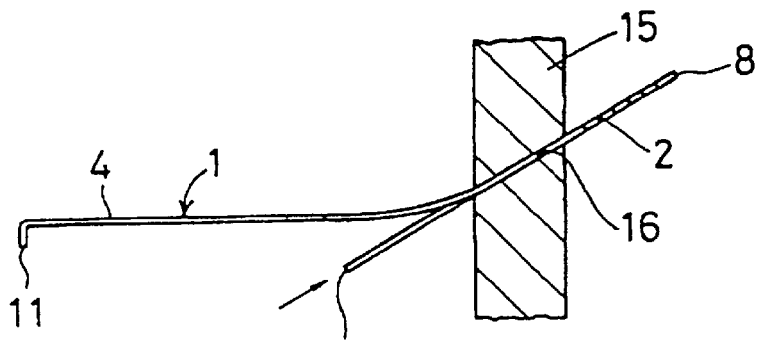
FIGS. 2 through 2F are sectional views showing the driving steps of the plate-shaped fastener.
Figure 2B:
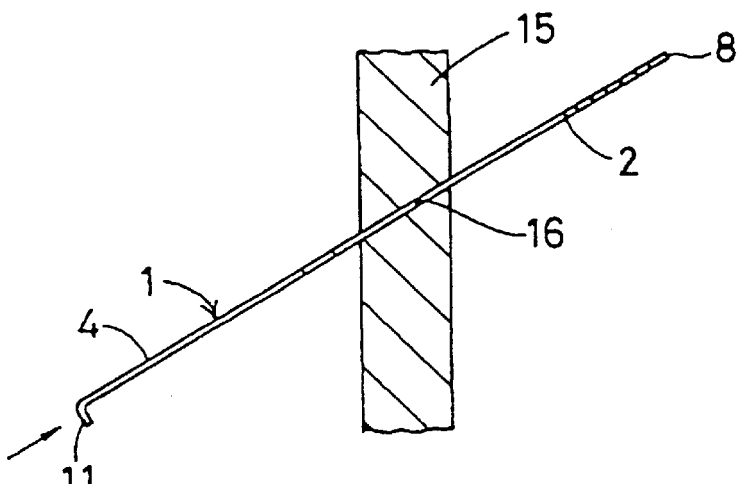

With the driving portion 2 facing the surface of a plasterboard wall 15 in an inclined state as shown FIG. 2A, the driving portion 2 is driven in an inclined state by striking the driving end 3 with a hammer. With the progression of driving, the bridge portions 10 will penetrate into a hole 16 formed by the driving portion 2, so that as shown in FIG. 2B, the bent extension 4 will become straight with respect to the driving portion 2. Thereafter, the rear end of the extension 4 is struck to continue driving.

Figure 2C:
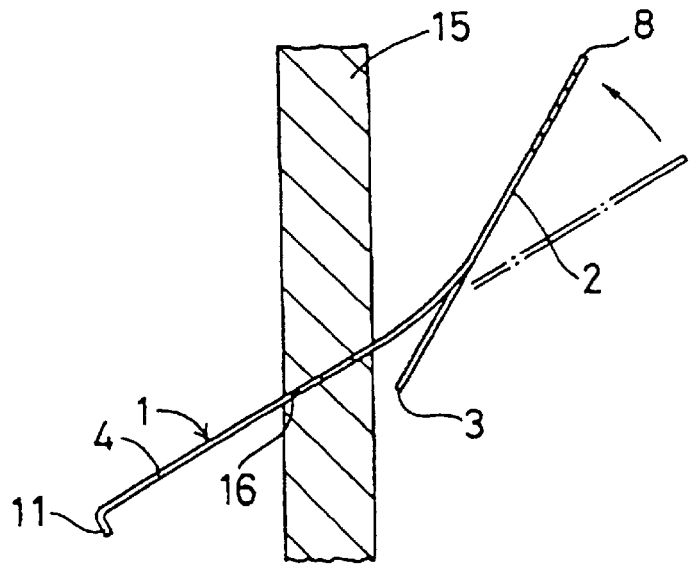
Figure 2D:
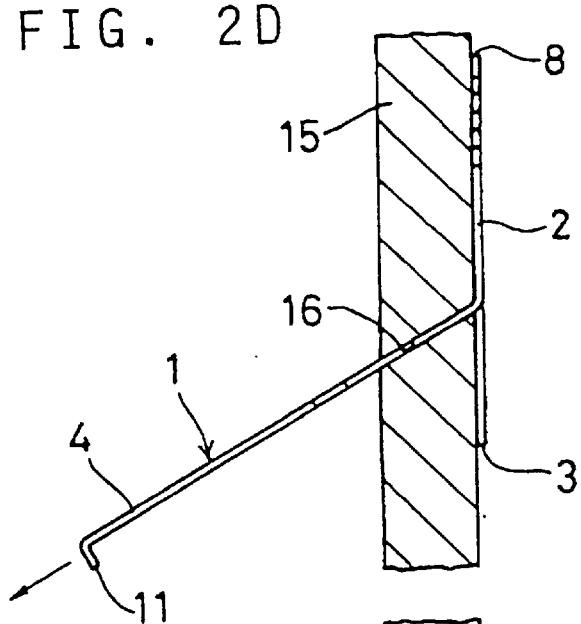

When the driving portion 2 completely passes through the wall 15, driving is stopped. As shown in FIG. 2C, due to the recovering resilience of the metal sheet, the driving portion 2 and the extension 4 will return to the original state having an angle. Next, as shown in FIG. 2D, when the extension 4 is pulled back, the driving portion 2 is pressed against the back of the wall 15, so that the plate-shaped fastener 1 cannot be pulled out of the wall 15 any more.

Figure 2E:
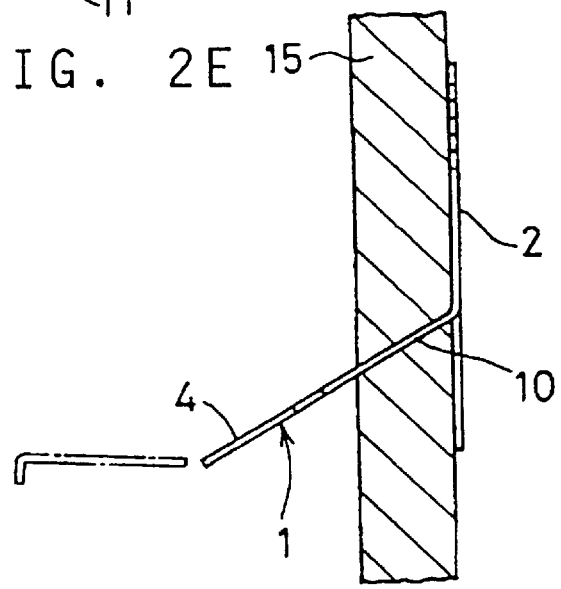
Figure 2F:
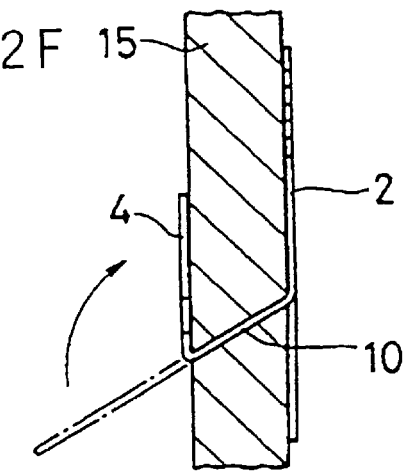
Figure 3A:
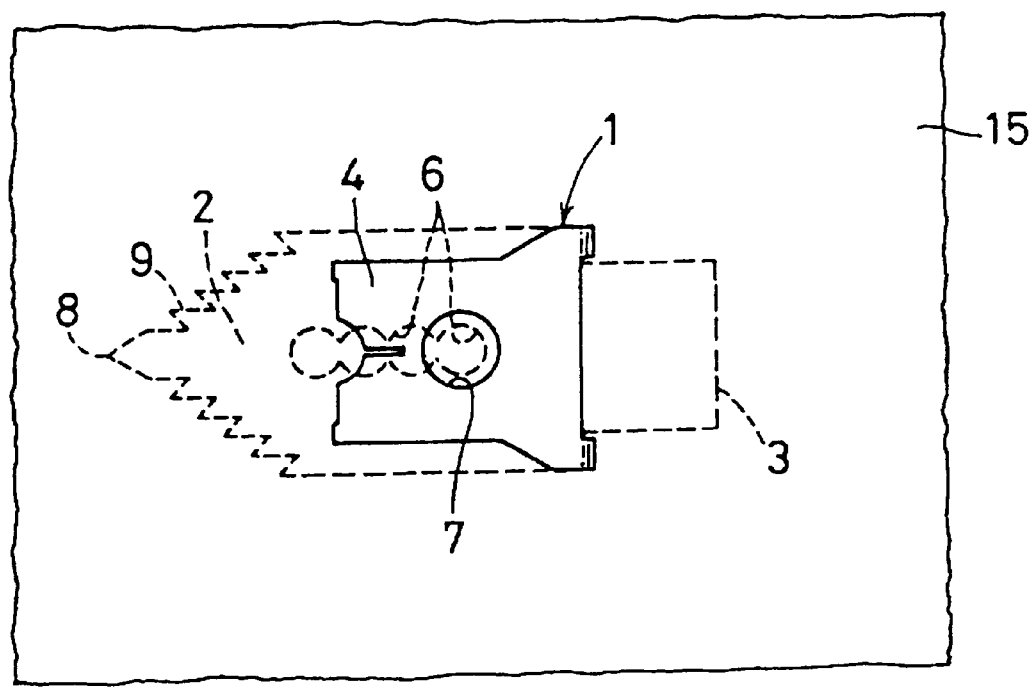
FIG. 3A is a front view showing a driven state.
Figure 3B:
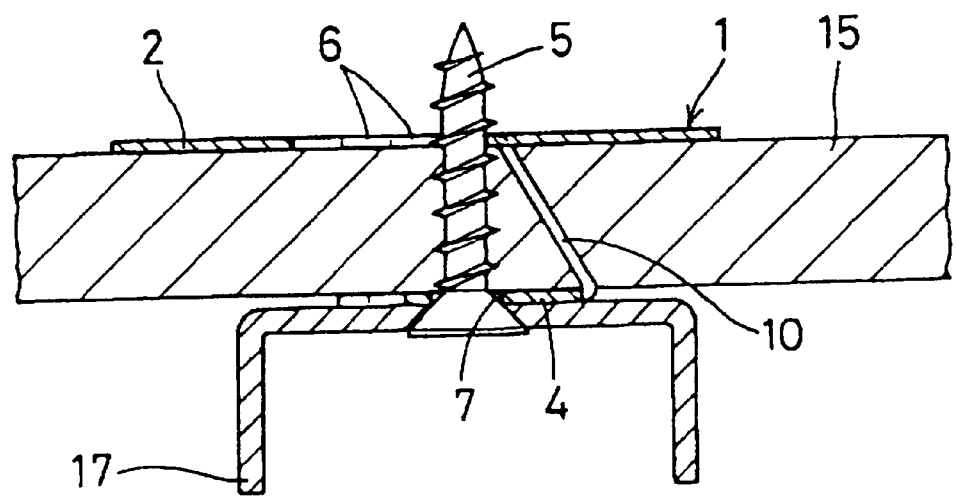
FIG. 3B is a lateral section showing how a member is secured.

Thereafter, as shown in FIG. 2E, the rear portion of the extension 4 is bent and removed at the portion where the through hole 12 and slits 13 are formed. Next, as shown in FIG. 2F, the portion of the extension 4 protruding from the wall 15 is bent and pressed against the surface of the wall 15. The plate-shaped fastener 1 thus becomes U-shaped with its driving portion 2 and extension 4 sandwiching the wall 15 from both sides.

Next, in order to mount a member 17 to the surface of the wall 15 (FIG. 3B), the member 17 is superposed on the surface of the extension 4, and the screw 5 passed through the member 17 is threaded through the insertion hole 7 into the wall 15. The screw 5 driven into the wall 15 is threadedly engaged in the engagement hole 6 formed in the driving portion 2. By threadedly tightening this screw 5, the member 17 can be secured to the wall 15 using the plate-shaped fastener 1 as an anchor.

The plate-shaped fastener 1 tightens the member 17 by sandwiching the wall from both sides with its driving portion 2 and extension 4, and engaging the screw 5 through the insertion hole 7 formed in the extension 4 and the engagement hole 6 of the driving portion 2. Thus members or instruments can be mounted to a wall to the back of which no hand is reachable. Also, tightening force is assured until the plasterboard is destroyed. Moreover, since the bridge portions 10 pass through the wall, no co-turning of the fastener will occur when the screw is tightened. A film tightening feeling is thus obtained.

Second Embodiment

Figure 4A:
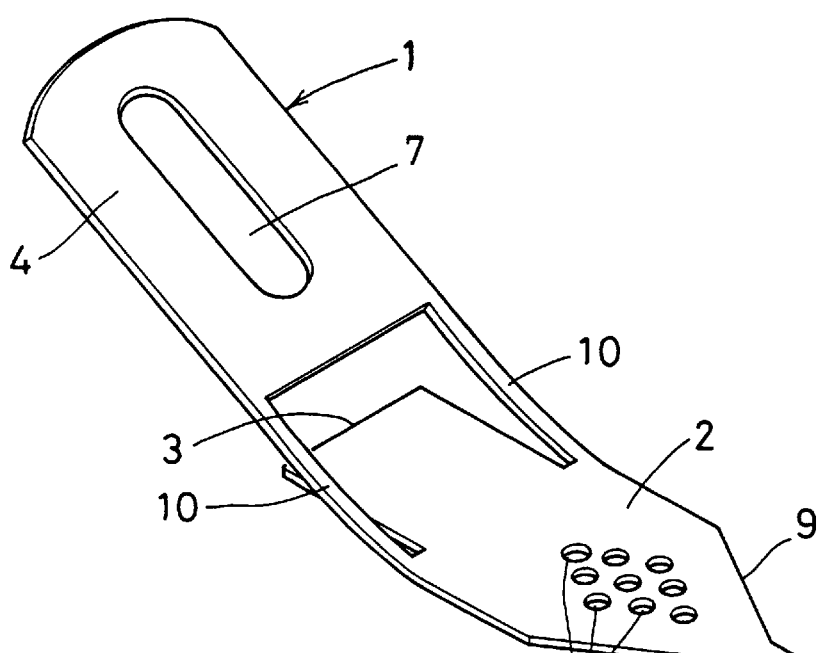
FIG. 4A is a perspective view showing a second embodiment.
Figure 4B:
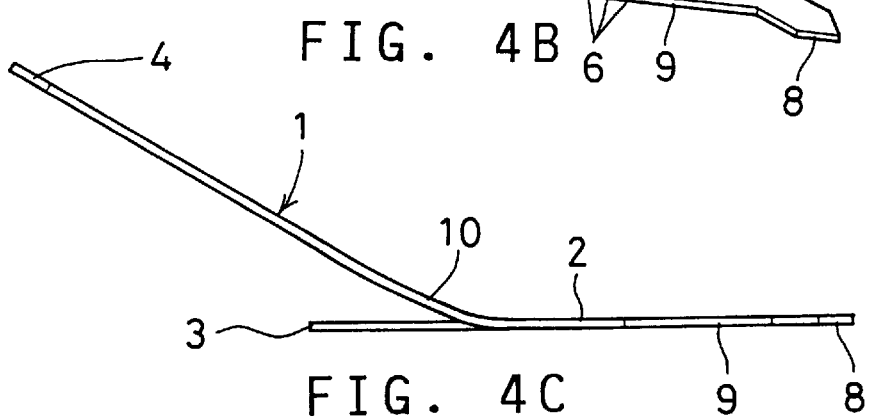
FIG. 4B is its side view.
Figure 4C:
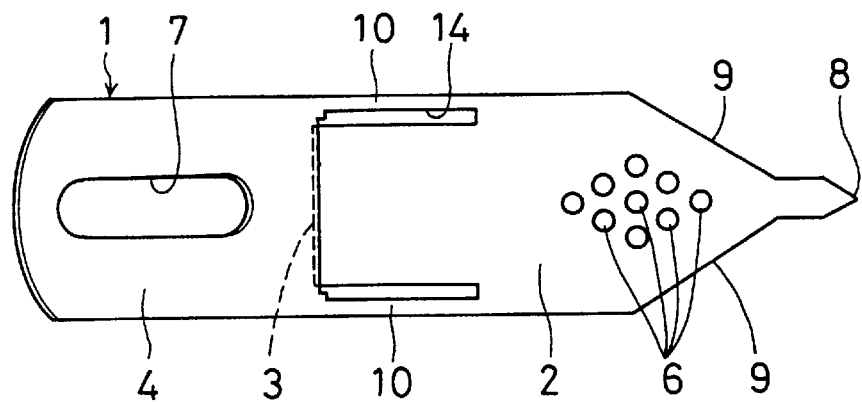
FIG. 4C is its plan view.

Next, a second embodiment of the plate-shaped fastener shown in FIGS. 4A through 4C is described. For the same parts of this second embodiment as those of the first embodiment, the same numerals are used and their description is omitted. This is true for the subsequent embodiments as well.

Since the second embodiment is basically the same as the first embodiment, only parts that are structurally different are described. The fastener 1 of the second embodiment has a driving portion 2 and an extension 4 having the same width. The insertion hole 7 formed in the center of the extension 4 is formed as an elongate hole in the longitudinal direction, and the sharp blades 9 provided in the driving portion 2 are straight.

The engagement hole 6 of the driving portion 2 is formed by providing a plurality of separate holes which have a diameter equal to the root diameter of the screw. The number, arrangement and shape of such separate holes may be determined as required. They may be circular, square, oval, or may have any other irregular shape. By forming the hole 6 from a plurality of separate holes, the range in which the screw 5 can engage increases, so that tightening work by the screw 5 can be performed smoothly.

Third Embodiment

Figure 5A:
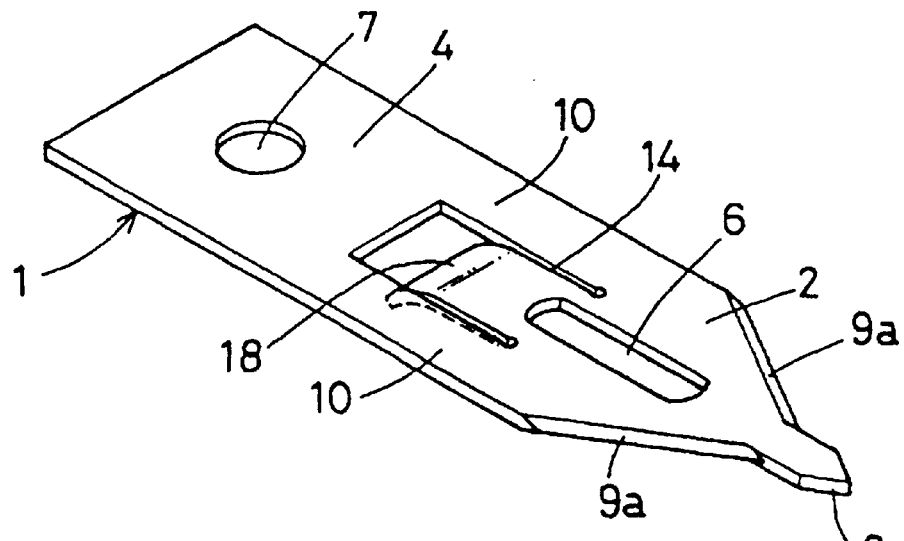
FIG. 5A is a perspective view showing a third embodiment.
Figure 5B:
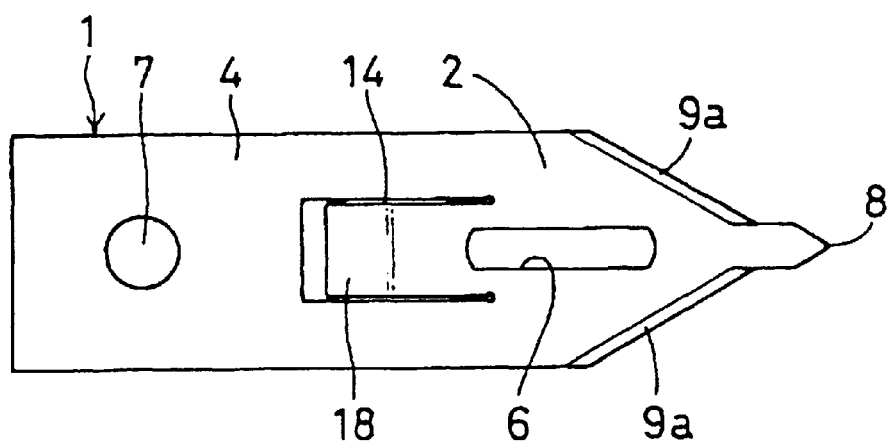
FIG. 5B is its plan view.
Figure 5C:
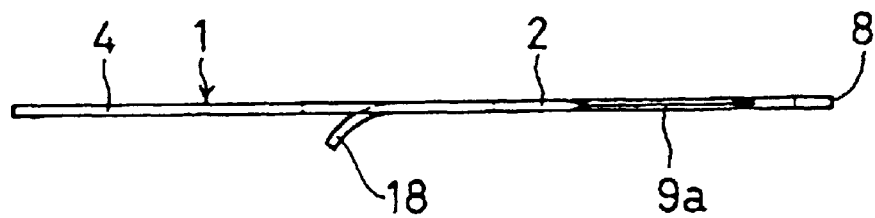
FIG. 5C is its side view.

The fastener 1 of the third embodiment shown in FIGS. 5A to 5C uses a single thin metal plate to integrally form the driving portion 2 and the extension 4 into a flat state. A cut 14 having a U-shape is formed in the rear side of the driving portion 2 at its center. The rear end of the portion surrounded by the cut 14 is bent arcuately to one side to form a bent portion 18 for preventing the fastener from falling.

In this third embodiment, the inclined portions at both sides of the tip of the driving portion 2 are tapered cutting edges 9a. The engagement hole 6 formed in the driving portion 2 is formed by an elongate hole having a width which is substantially equal to the root diameter of the screw 5.

Fourth Embodiment

Figure 6A:
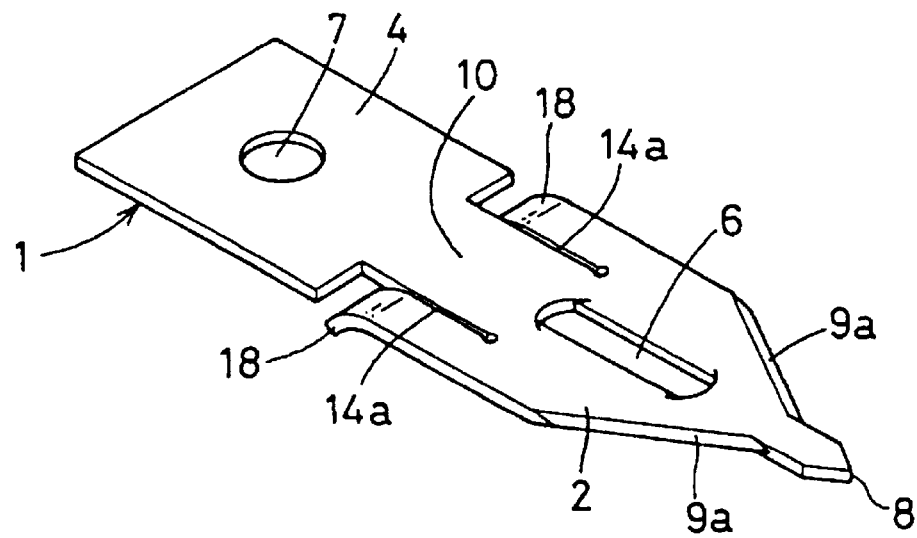
FIG. 6A is a perspective view showing a fourth embodiment.
Figure 6B:
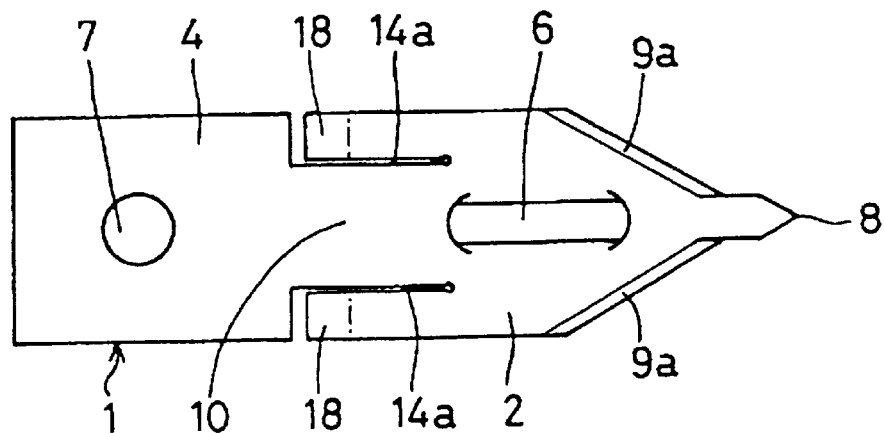
FIG. 6B is its plan view.
Figure 6C:
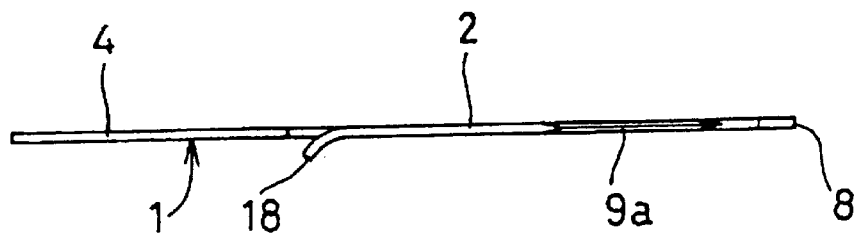
FIG. 6C is its side view.

The fourth embodiment shown in FIGS. 6A to 6C is a modified version of the third embodiment. L-shaped cuts 14a are formed on both sides of the rear end of the driving portion 2. The portion between the cuts 14a is a bridge portion 10, and the rear ends of the cuts 14a form bent portions 18. The fourth embodiment is used in the same manner as the third embodiment.

Figure 7A:
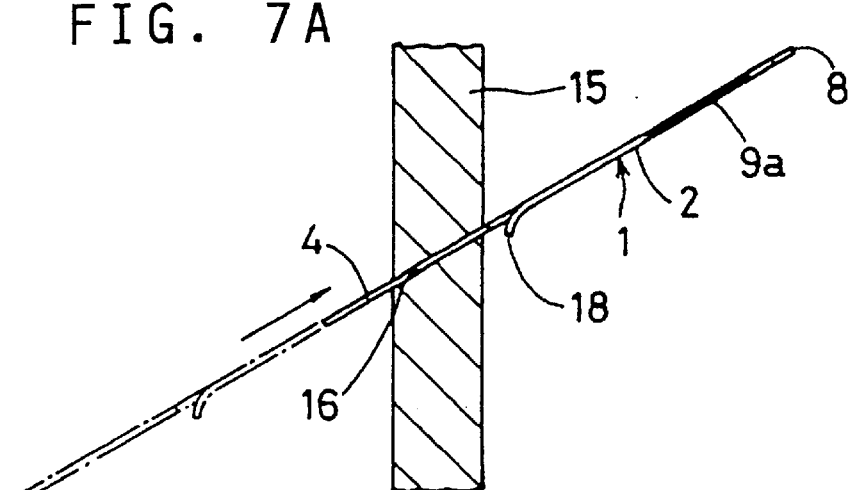
FIGS. 7A through 7C are sectional views showing sequentially the driving steps of the fourth embodiment.
Figure 7B:
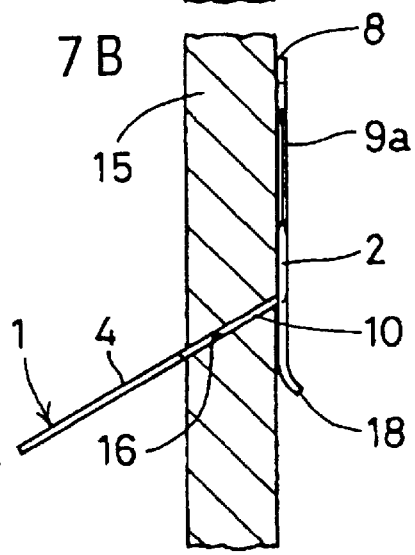

The plate-shaped fasteners of the third and fourth embodiments are structured as described above, and as shown in FIG. 7A, by striking from the rear end of the extension 4, the plate-shaped fastener 1 is driven into the plasterboard wall 15 in an inclined state, and when the entire length of the driving portion 2 passes through the wall 15, the extension 4 is pulled back as shown in FIG. 7B.

During this pullback, the bent portion 18 becomes a return stop by abutting the back side of the wall 15, so that the driving portion 2 is pressed against the back of the wall 15, and so that the driving portion 2 and the extension 4 are bent with respect to each other.

Figure 7C:
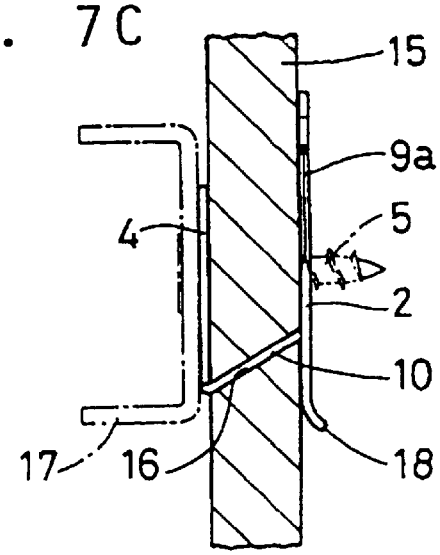

When the driving portion 2 presses against the back of the wall 15, the portion of the extension 4 protruding from the wall 15 is bent and pressed against the surface of the wall 15 as shown in FIG. 7C to sandwich the wall 15 between the driving portion 2 and the extension 4. Thereafter, in the same manner as in the first embodiment, the member 17 is secured by use of the screw 5.

In the first and second embodiments, the cuts formed to provide an angle between the driving portion 2 and the extension 4 may be, as shown in the fourth embodiment, L-shaped cuts formed on both sides of the fastener so that the bridge portion between the cuts can be bent arcuately. The shapes and structures of the blades, engagement hole, insertion hole of the respective embodiments are replaceable with each other.

As described above, according to this invention, since a plasterboard is sandwiched between the driving portion and the extension, the tension strength when a member or an instrument is secured by a screw becomes maximum until the plasterboard is destroyed. Thus it is possible to firmly fix members or instruments to a brittle plasterboard.

Also, since the thin plate penetrates through a plasterboard wall, no co-turning will occur when a screw is driven in. Since the screw is tightened into the driving portion at its back, a rigid tightening feeling is obtained. Furthermore, since the fastening work can be done easily using a hammer and a driver, workability is high. Since it is formed by blanking a single thin metal plate, the cost is low.

What is claimed is:

1. A plate-shaped fastener comprising a driving portion with a pointed tip, and an extension extending at an angle with respect to said driving portion with the rear end of said driving portion serving as a driving end, wherein said driving portion and said extension are integrally formed from a single bendable thin metal plate, said driving portion being formed with an engagement hole for a screw and said extension being formed with an insertion hole for the screw, and wherein a cut having a U-shape is formed in said thin metal plate so as to form bridge portions at both sides of said cut and wherein said driving portion and said extension are formed at an angle with each other by bending said bridge portions, the rear end of said cut forming said driving end of said driving portion.

2. The fastener claimed in claim 1 wherein said engagement hole formed in said driving portion is an elongate hole elongated in the longitudinal direction of the thin plate, and wherein a plurality of protrusions are formed on the inner periphery of the elongate hole.

3. The fastener as claimed in claim 1 wherein said engagement hole for a screw formed in said driving portion is formed by a plurality of independent holes.

4. A plate-shaped fastener wherein a driving portion with a pointed tip and an extension are integrally formed from a single bendable thin metal plate, a cut being formed in a central portion of the thin metal plate to form said driving portion and said extension and wherein the rear end of said cut is bent to one side, and wherein said driving portion is formed with an engagement hole for a screw and said extension is formed with an insertion hole for the screw.

5. The fastener claimed in claim 4 wherein said engagement hole formed in said driving portion is an elongate hole elongated in the longitudinal direction of the thin plate, and wherein a plurality of protrusions are formed on the inner periphery of the elongate hole.

6. The fastener as claimed in claim 4 wherein said engagement hole for a screw formed in said driving portion is formed by a plurality of independent holes.

7. A plate-shaped fastener comprising a driving portion with a pointed tip, and an extension extending at an angle with respect to said driving portion with the rear end of said driving portion serving as a driving end, wherein said driving portion and said extension are integrally formed from a single bendable thin metal plate, said driving portion being formed with an engagement hole for a screw and said extension being formed with an insertion hole for the screw, and wherein L-shaped cuts are formed on both sides of the thin metal plate in a center thereof and wherein said driving portion and said extension are formed at an angle with each other by bending a bridge portion disposed between said cuts, the rear ends of said cuts being bent to form said driving end of said driving portion.

8. The fastener claimed in claim 7 wherein said engagement hole formed in said driving portion is an elongate hole elongated in the longitudinal direction of the thin plate, and wherein a plurality of protrusions are formed on the inner periphery of the elongate hole.

9. The fastener as claimed in claim 7 wherein said engagement hole for a screw formed in said driving portion is formed by a plurality of independent holes.

* * * * *